(12) United States Patent
Kwak et al.

(10) Patent No.: US 8,229,045 B2
(45) Date of Patent: Jul. 24, 2012

(54) APPARATUS AND METHOD FOR MEASURING CARRIER TO INTERFERENCE AND NOISE RATIO

(75) Inventors: Ki Young Kwak, Seongnam-si (KR); Kang Min Lee, Yongin-Si (KR); Ji Myung Oh, Goyang-si (KR); Yong Suk Hwang, Yongin-si (KR)

(73) Assignee: SeAH Networks Co., Ltd., Gangnam-gu (KR)

( * ) Notice: Subject to any disclaimer, the term of this patent is extended or adjusted under 35 U.S.C. 154(b) by 1059 days.

(21) Appl. No.: 12/159,698

(22) PCT Filed: Dec. 28, 2006

(86) PCT No.: PCT/KR2006/005802
§ 371 (c)(1),
(2), (4) Date: Jun. 30, 2008

(87) PCT Pub. No.: WO2007/078099
PCT Pub. Date: Jul. 12, 2007

(65) Prior Publication Data
US 2009/0016420 A1 Jan. 15, 2009

(30) Foreign Application Priority Data

Dec. 30, 2005 (KR) .................. 10-2005-0134648

(51) Int. Cl.
*H03D 1/04* (2006.01)
(52) U.S. Cl. ........ 375/346; 375/260; 375/295; 375/316; 375/342; 375/350; 455/436; 455/442

(58) Field of Classification Search .................. 375/135, 375/146, 147, 150, 227, 243, 259, 260, 262, 375/267, 271, 299, 306, 316, 322, 330, 350, 375/222, 261, 295, 342–346
See application file for complete search history.

(56) References Cited

U.S. PATENT DOCUMENTS 5,852,630 A * 12/1998 Langberg et al. ............. 375/219
(Continued)

FOREIGN PATENT DOCUMENTS
EP 1207663 5/2002
(Continued)

*Primary Examiner* — Hirdepal Singh
(74) *Attorney, Agent, or Firm* — Blank Rome LLP

(57) ABSTRACT

Provided are an apparatus and method for measuring a carrier-to-interference and noise ratio (CINR) using a pilot symbol in a digital communication system, and more particularly, to an apparatus and method for measuring a CINR by estimating a data signal, noise, and an interference signal from a pilot symbol in a digital communication system using orthogonal frequency division multiplexing (OFDM)/orthogonal frequency division multiplexing access (OFDMA). The apparatus includes: a pilot symbol acquisition unit for acquiring the pilot symbol from a baseband frequency signal; a signal estimation unit for estimating a pilot signal and a data signal from the pilot symbol; a power calculation unit for calculating a power value of the estimated data signal and calculating a power value of a noise signal from a difference between the pilot symbol and an estimated pilot signal; and a CINR calculation unit for calculating a CINR on the basis of the power values of the data and noise signals. Thus, a pilot symbol is used for more easily and precisely measuring a CINR of a received signal, and scheduling of a base station and transmission power control of a terminal are performed on the basis of the measured CINR.

13 Claims, 13 Drawing Sheets

U.S. PATENT DOCUMENTS

| | | | |
|---|---|---|---|
| 6,426,971 B1 | 7/2002 | Wu et al. | |
| 7,382,718 B2 * | 6/2008 | Chang et al. | 370/204 |
| 7,826,417 B2 * | 11/2010 | Yang et al. | 370/329 |
| 8,000,421 B2 * | 8/2011 | Takano et al. | 375/349 |
| 8,014,807 B2 * | 9/2011 | Matsumoto et al. | 455/522 |
| 2005/0105589 A1 * | 5/2005 | Sung et al. | 375/130 |
| 2005/0288020 A1 * | 12/2005 | Cho et al. | 455/436 |
| 2006/0003767 A1 * | 1/2006 | Kim et al. | 455/436 |
| 2006/0008037 A1 * | 1/2006 | Chang et al. | 375/346 |
| 2006/0093074 A1 * | 5/2006 | Chang et al. | 375/340 |
| 2007/0149249 A1 * | 6/2007 | Chen et al. | 455/561 |
| 2009/0175178 A1 * | 7/2009 | Yoon et al. | 370/252 |

FOREIGN PATENT DOCUMENTS

| | | |
|---|---|---|
| EP | 1555761 | 7/2005 |
| KR | 10-2005-0039453 | 4/2005 |
| KR | 10-2005-0074884 | 7/2005 |

* cited by examiner

FIG. 4
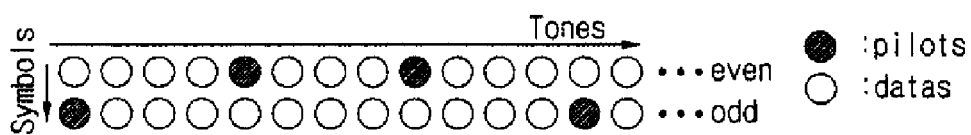
(401)
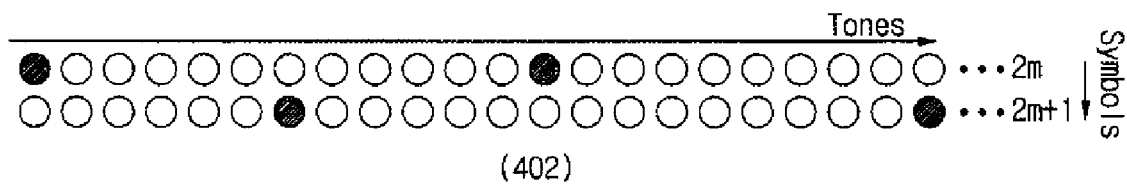
(402)
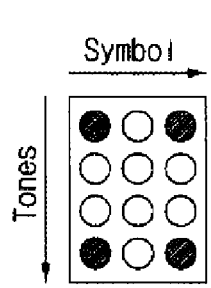
(403)
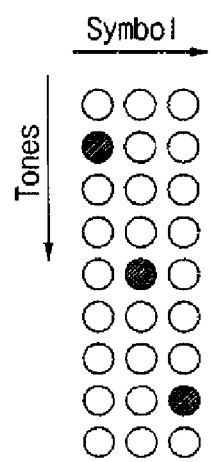
(404)

FIG. 12
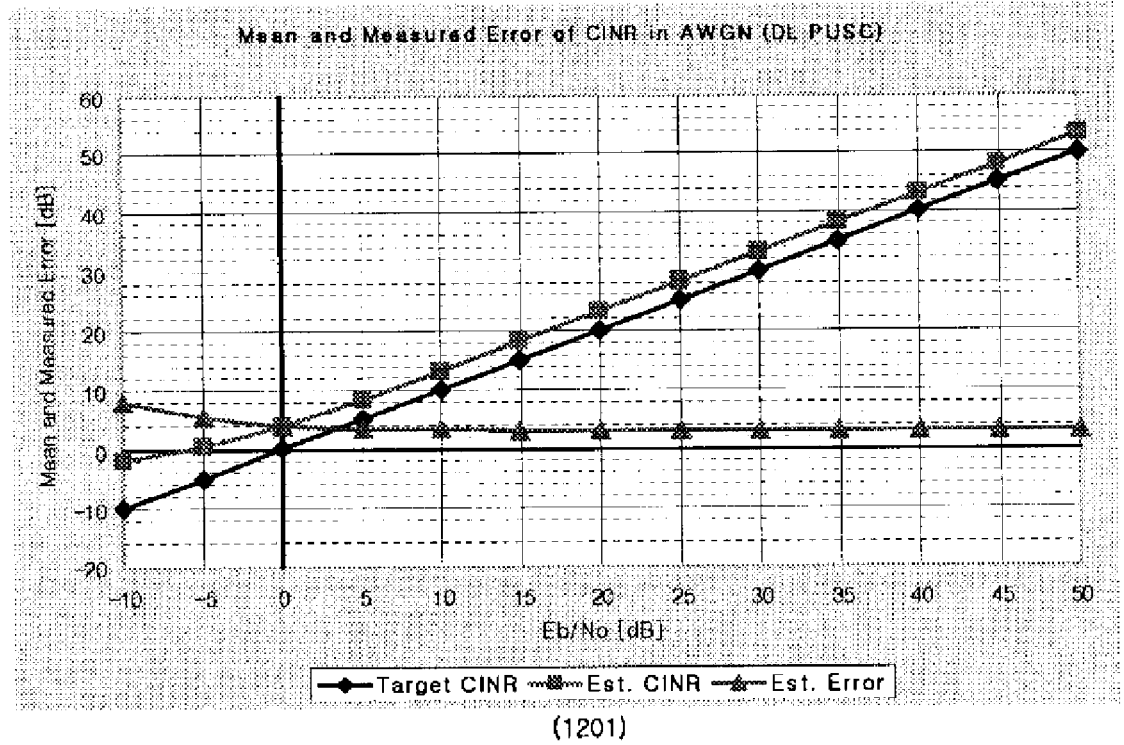
(1201)
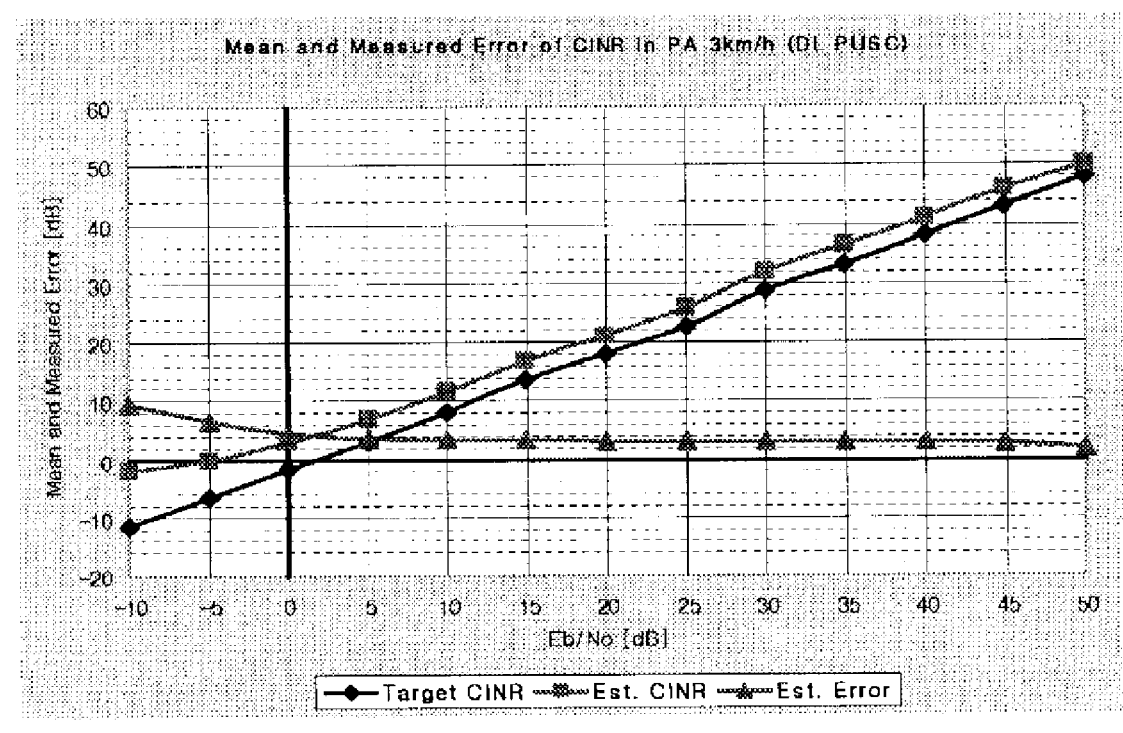
(1202)

FIG. 13
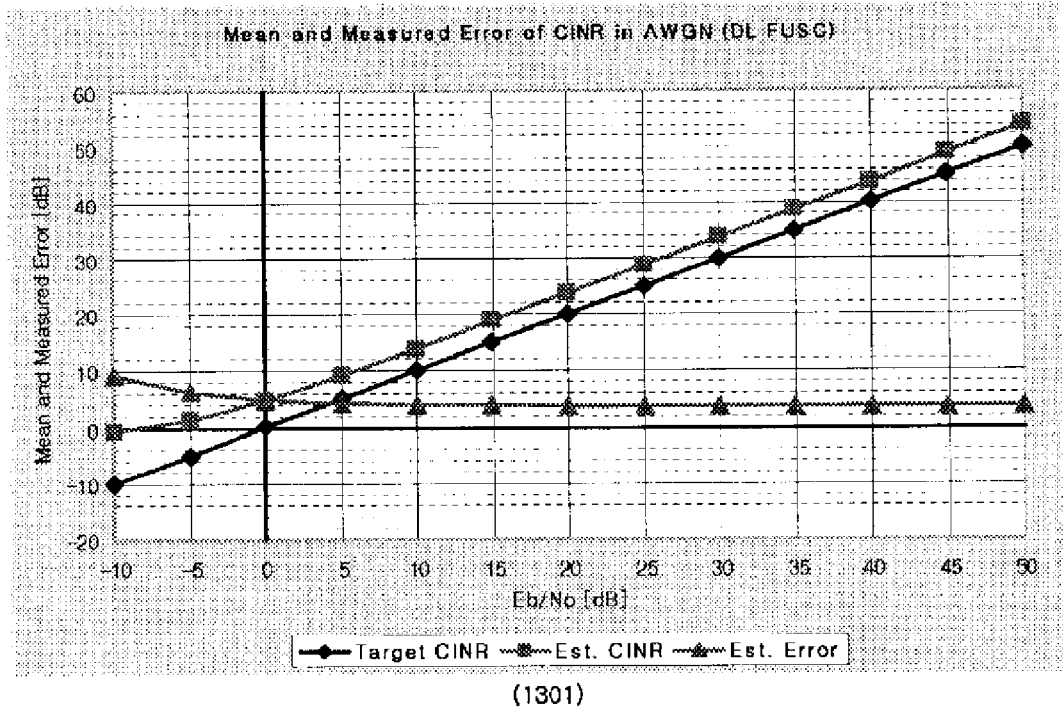
(1301)
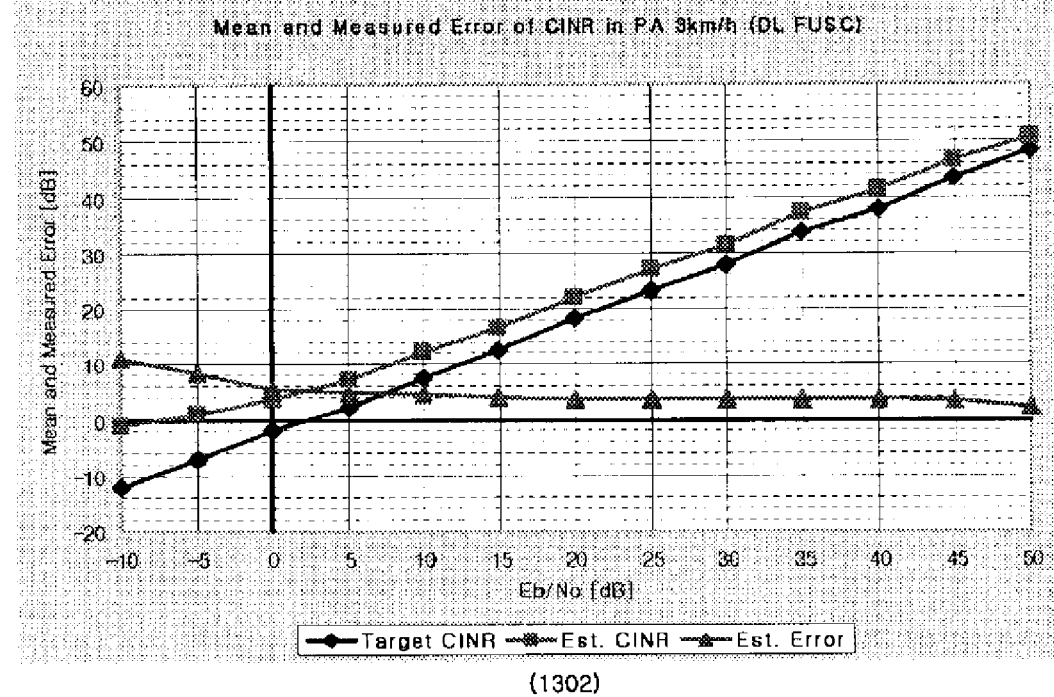
(1302)

FIG. 14
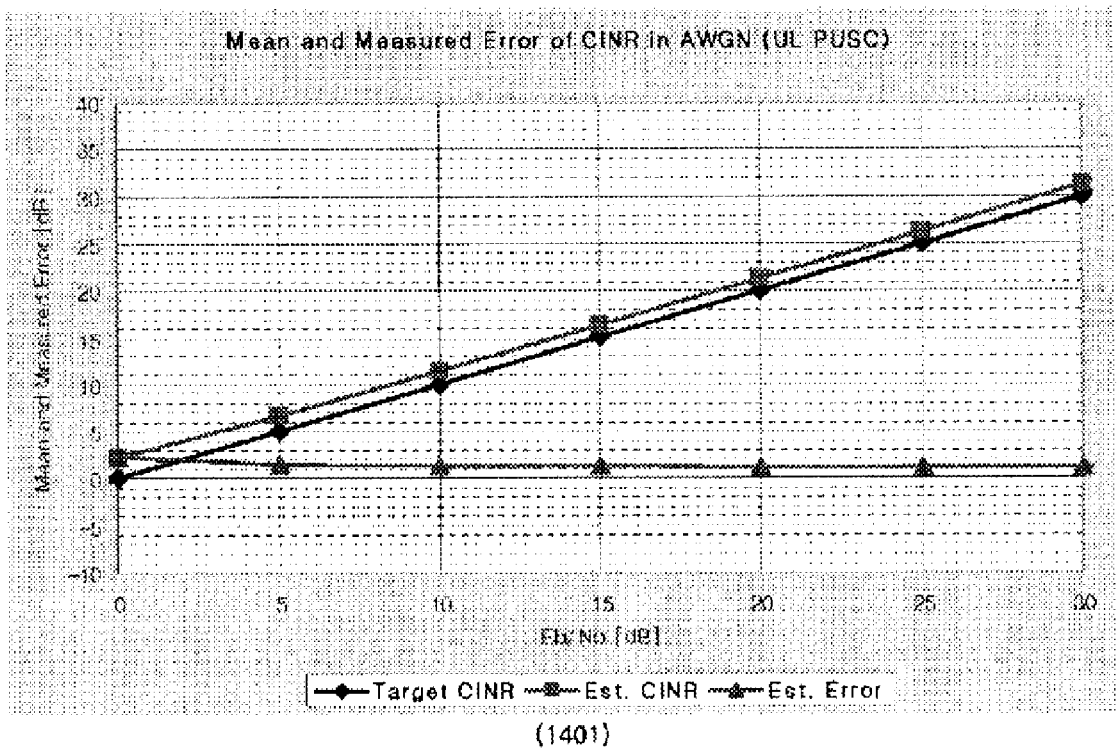
(1401)
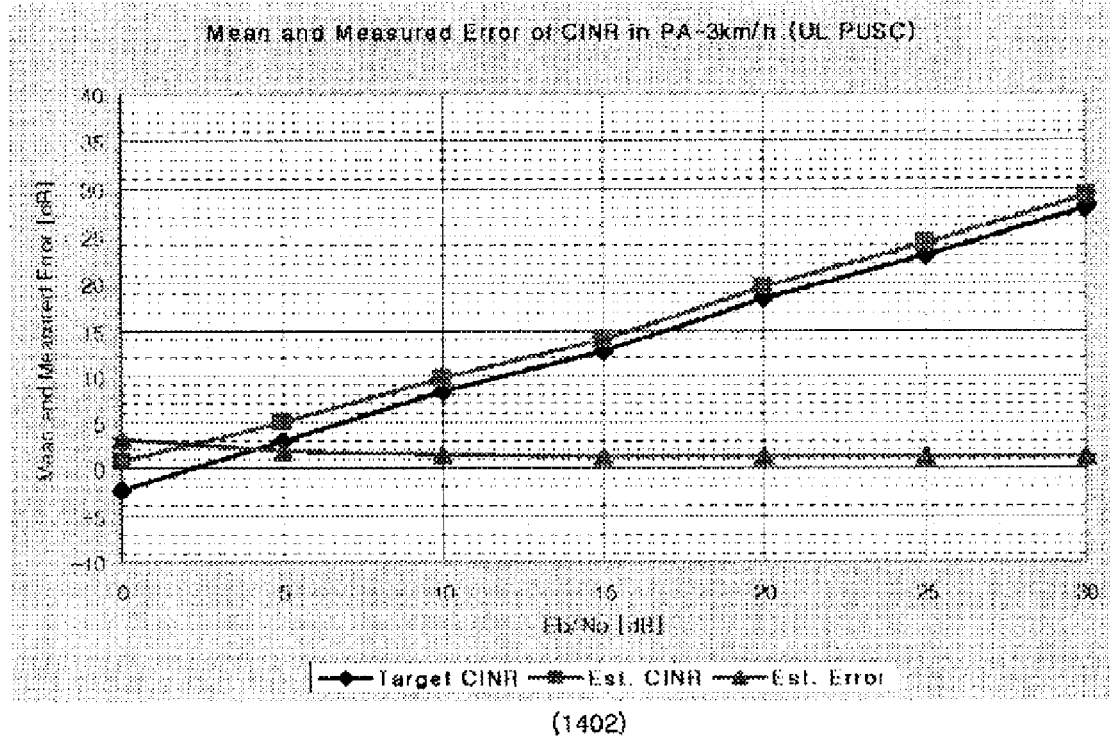
(1402)

FIG. 15
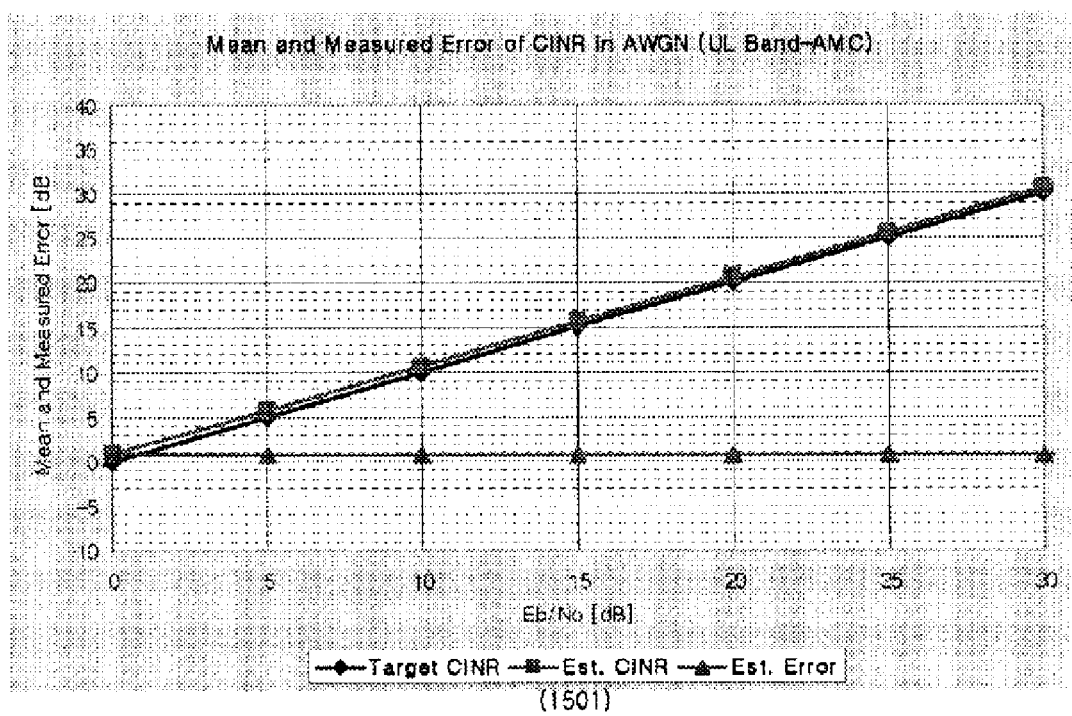
(1501)
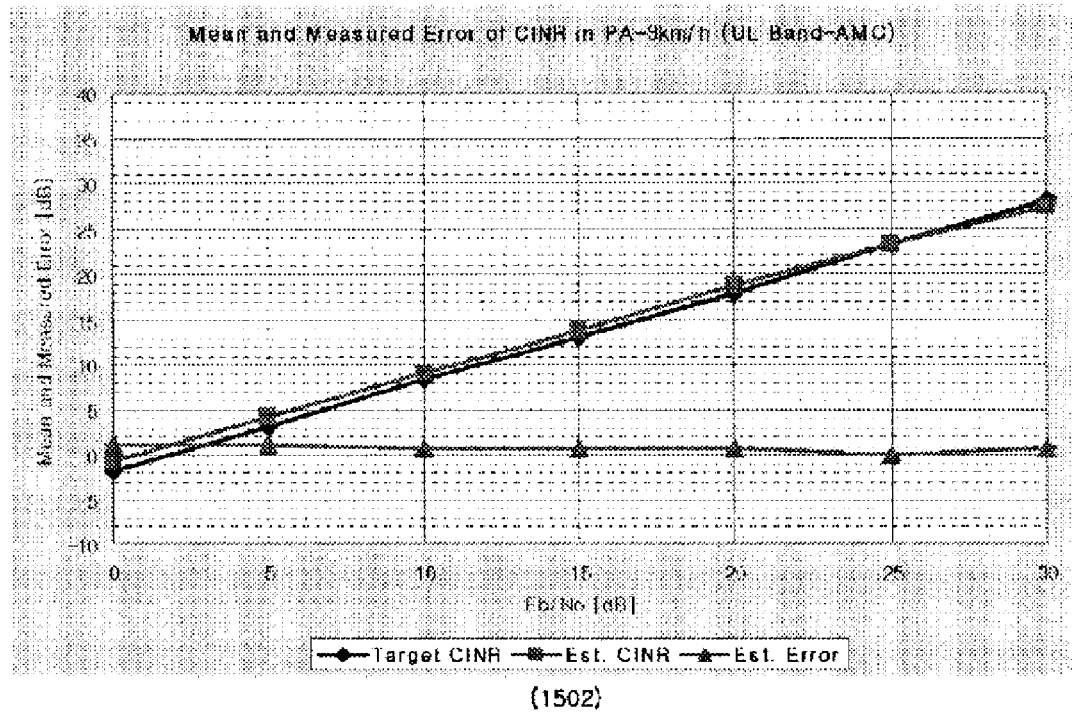
(1502)

APPARATUS AND METHOD FOR MEASURING CARRIER TO INTERFERENCE AND NOISE RATIO

CROSS-REFERENCE TO RELATED APPLICATIONS

The present application is a National Phase of PCT/KR2006/005802, filed Dec. 28, 2006, which claims the benefit of Korean Application No. 10-2005-0134648, filed Dec. 30, 2005, the entire disclosures of which are incorporated herein by reference.

FIELD OF THE INVENTION

1. Technical Field

The present invention relates to an apparatus and method for measuring a carrier- to-interference and noise ratio (CINR) using a pilot symbol in a digital communication system, and more particularly, to an apparatus and method for measuring a CINR by estimating a data signal, noise, and an interference signal from a pilot symbol in a digital communication system using orthogonal frequency division multiplexing (OFDM)/orthogonal frequency division multiplexing access (OFDMA).

2. Background of the Invention

In the case that a signal is transmitted through multi-path channels, a received signal is affected by an inter-symbol interference (ISI) due to a multi-path. To reduce signal distortion due to the ISI, a symbol frequency should be larger than a delay spread of the channel. As a modulation method of simply compensating the distortion in this multi-path channel, orthogonal frequency division multiplexing (OFDM) or orthogonal frequency division multiplexing access (OFDMA) has been conceived. Contrary to a transmission method using a single carrier, the OFDM method transmits data through a plurality of sub-carriers orthogonal to one another. That is, the OFDM performs serial-parallel conversions equivalent to the number of sub-carriers used in data modulation and modulates the transformed data through a corresponding sub-carrier, so that the symbol frequency of each sub-carrier becomes longer as the number of sub-carriers increases while maintaining constant data transmission speed. Using the sub-carriers orthogonal to one another, a bandwidth and the symbol frequency are more efficient and longer than those resulting from conventional frequency division multiplexing (FDM), so that the OFDM is effective for the ISI as compared with a modulation method using the single carrier.

In the OFDM system, modulation/demodulation of a transceiver is implemented by inverse discrete Fourier transform (IDFT) and discrete Fourier transform (DFT), which can be replaced for efficiency by inverse fast Fourier transform (IFFT) and fast Fourier transform (FFT), respectively. Further, if a guard interval larger than the delay spread of the channel is inserted in every symbol frequency to be transmitted, orthogonal integrity between the sub-carriers is secured.

In such an OFDM system, in order to perform power control or the modulation/demodulation, it is important to precisely measure channel signal quality more than anything else. As an example of the channel signal quality, a carrier-to-interference and noise ratio (CINR) plays an important role in an adaptive power controller or an adaptive modulator/demodulator, which controls power or modulation/demodulation levels according to channel quality. The CINR is defined as a value obtained by dividing a signal power sum of each sub-carrier by a noise and interference power sum, and may be a yardstick of the channel quality in the OFDM system.

U.S. Pat. No. 6,456,653, entitled "Fast and Accurate Signal-To-Noise Ratio Estimation Technique for OFDM System", discloses conventional technology for measuring the channel quality. Generally, in the OFDM/OFDMA system, a transmitter transforms data through the IFFT before transmitting it. If the size of the IFFT is a point of non-equidistant fast Fourier transform (NFFT), only active sub-carriers are used but the other inactive sub-carriers are made to 'O'. Thus, among signals undergoing the FFT in a receiver, active sub-carriers include data and noise, and the other inactive sub-carriers include only noise. In the above US patent, noise levels of the other inactive sub-carriers are measured, and it will be supposed that the measured values are the same noise levels of the data. Then, the noise levels are subtracted from active sub-carriers including both the data and the noise thereby estimating an original signal level, and then a ratio of the original signal level to the noise level is calculated, thereby estimating the SNR. The foregoing US patent employs the inactive sub-carriers for estimating the noise and the inference from the received signal. Further, because it is supposed that all terminals and users have the same noise and the same interference in this US patent, an error between measured CINR values may become larger in real communication systems which are different according to terminals or users.

Another conventional technology is disclosed in Korean Patent Application No. 10-2004-30569, entitled "Apparatus and Method of Estimating Interference and Noise in Communication System, and Apparatus and Method of Estimating a CINR of the Same".

Contrary to the foregoing U.S. patent, this Korean Patent discloses a method of estimating a CINR value through a transmitted pilot signal. That is, among signals undergoing the FFT in a receiver, pilot signals including data and noise are obtained, and noise and interference component signals are estimated from the pilot signals. Then, a data signal is estimated using difference between the obtained pilot signal and the noise and interference component signals. Thus, a power ratio of the estimated data signal to the noise and interference component signals are calculated, thereby obtaining a CINR value. Like the above US patent, this Korean Patent supposes that all terminals or users have the same noise and the same interferences while estimating noise and interference components, but this is not the case in real wireless conditions. Further, in the Korean Patent, when the received signal is demodulated, a new block is needed separately from channel compensation or channel estimation according to varied channel conditions, so that processes may be complicated and power is wastefully consumed.

Accordingly, easier and more precise calculation methods are required in measuring a data signal-to-noise and interference signal ratio.

Therefore, the present invention proposes new technology that can more easily and precisely measure a CINR from a pilot symbol of a received signal in a digital communication system, efficiently utilizing the CINR.

SUMMARY OF THE INVENTION

The present invention is directed to more easily and precisely measuring a CINR of a received signal using a pilot symbol.

The present invention is also directed to more precisely estimating a data signal from a pilot symbol using an interpolation operation and an averaging operation.

The present invention is also directed to maximizing throughput of a communication terminal by flexibly regulating wireless resource components on the basis of a CINR measured in a base station.

The present invention is also directed to controlling transmission power of a communication terminal to constantly maintain an intensity of a signal received from the communication terminal on the basis of a CINR in a base station can.

The present invention is also directed to producing optimum transmission power adaptive to variable communication environments using a CINR measured by a communication terminal.

The present invention is also directed to measuring a CINR and a reference CINR for multiple-zones, so that a base station allocates adaptive zones to respective terminals or allows the terminal itself to positively require channel allocation for another zone in consideration of a channel environment.

One aspect of the present invention provides an apparatus for measuring a carrier-to-interference and noise ratio (CINR) from a pilot symbol in a digital communication system, the apparatus comprising: a pilot symbol acquisition unit for acquiring the pilot symbol from a baseband frequency signal; a signal estimation unit for estimating a pilot signal and a data signal from the pilot symbol; a power calculation unit for calculating a power value of the estimated data signal and calculating a power value of a noise signal from a difference between the pilot symbol and an estimated pilot signal; and a CINR calculation unit for calculating a CINR on the basis of the power values of the data and noise signals.

Another aspect of the present invention provides a method of measuring a carrier-to-interference and noise ratio (CINR) from a pilot symbol in a digital communication system, the method comprising the steps of: acquiring the pilot symbol from a baseband frequency signal; estimating a pilot signal and a data signal from the pilot symbol; calculating a power value of the estimated data signal and calculating a power value of a noise signal from a difference between the pilot symbol and the estimated pilot signal; and calculating a CINR on the basis of the power values of the data and noise signals.

According to the present invention, a pilot symbol of a received signal is used for more easily and precisely measuring a CINR.

According to the present invention, interpolation and averaging operations are employed for more precisely estimating a data signal from a pilot symbol.

According to the present invention, the maximum throughput of a communication terminal is maintained by flexibly scheduling wireless resource components on the basis of a CINR measured in a base station.

According to the present invention, transmission power of a communication terminal is controlled so that a base station can maintain constant intensity of a signal received from the communication terminal on the basis of a CINR.

According to the present invention, a CINR measured by a communication terminal is employed for generating optimum transmission power that is adaptive to variable communication environments, thereby enhancing communication quality.

According to the present invention, a CINR and a reference CINR are measured for multiple-zones, thereby allocating proper zones to terminals, respectively.

According to the present invention, the pilot signal, conventionally widely used, is employed in measuring the CINR, thereby minimizing separately added processes and efficiently configuring hardware/software.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 4 shows an example of a symbol structure corresponding to a plurality of channel modes, according to an exemplary embodiment of the present invention;

FIG. 12 is a graph showing a simulation result of a CINR measured using a pilot symbol on a DL PUSC channel, according to an exemplary embodiment of the present invention;

FIG. 13 is a graph showing a simulation result of a CINR measured using a pilot symbol on a DL FUSC channel, according to an exemplary embodiment of the present invention;

FIG. 14 is a graph showing a simulation result of a CINR measured using a pilot symbol on a UL PUSC channel, according to an exemplary embodiment of the present invention;

FIG. 15 is a graph showing a simulation result of a CINR measured using a pilot symbol on a UL Band-AMC channel, according to an exemplary embodiment of the present invention.

DETAILED DESCRIPTION OF THE PREFERRED EMBODIMENTS

Figure 1:
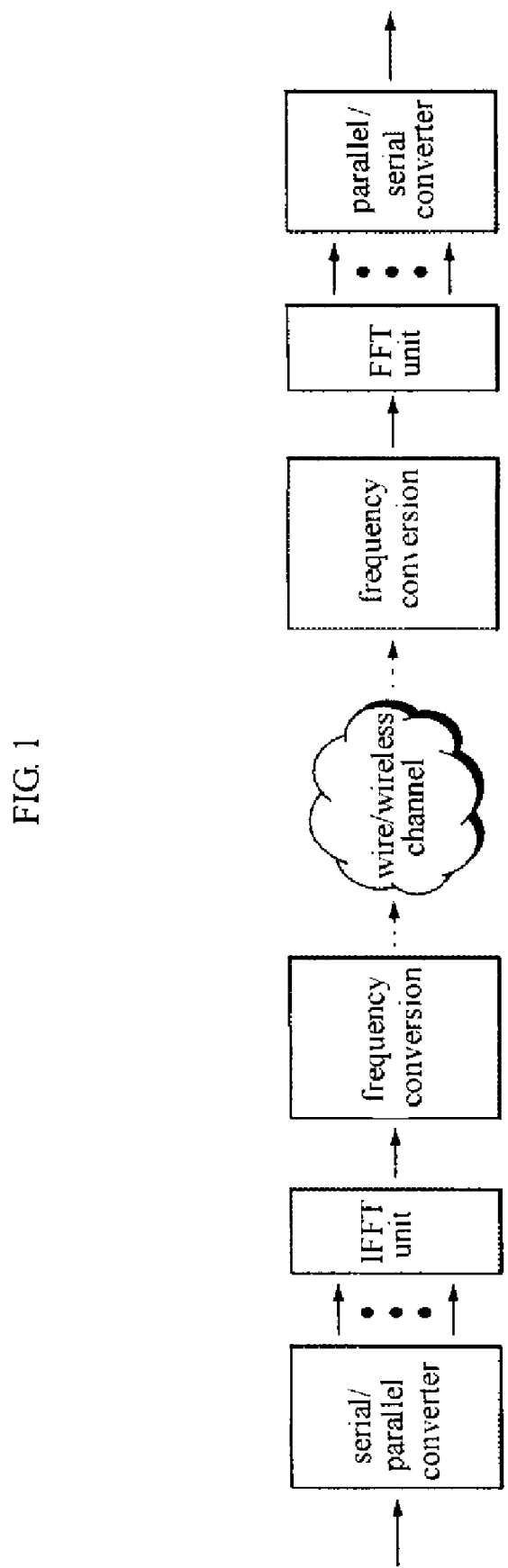
FIG. 1 is a schematic diagram of a general OFDM transceiver.

In the drawing figures:
301: Pilot symbol acquisition unit
302: Signal estimation unit

303: Power calculation unit
304: CINR calculation unit
501: Interpolation operation unit
502: Average operation unit
503: Gain mapping unit For reference, a "communication terminal" includes a personal digital cellular (PDC) phone, a personal communication service (PCS) phone, a personal handy phone system (PHS) phone, a code division multiplexing access (CDMA)-2000(1X, 3X) phone, a wideband code division multiplexing access (WCDMA) phone, a dual band/dual mode phone, a global standard for mobile (GSM) phone, a mobile broadband system (MBS) phone, a digital multimedia broadcasting (DMB) phone, a terminal, a smart phone, an orthogonal frequency division multiplexing (OFDM) communication terminal, an orthogonal frequency division multiplexing access (OFDMA) communication terminal, a personal digital assistant (PDA), a hand-held personal computer, a notebook computer, a laptop computer, a WiBro terminal, an MP3 player, an MD player or the like portable terminal, international mobile telecommunication (IMT-2000) providing international roaming service and expanded mobile communication service, or the like hand-held wireless communication device, an OFDMA module, a CDMA module, a Bluetooth module, infrared data association, wire/wireless local area network (LAN) card, a wireless communication device mounted with a global positioning system (GPS) chip, or the like predetermined communication modules mounted with a microprocessor to perform a certain operation.

Further, "noise (or a noise signal)" denotes not only abnormal unexpected noise generated under wireless communication environments but also interference between channels superposed in a frequency domain, which can be broadly understood that all other signals besides an original data signal to be transmitted are included in "noise". Thus, it will be appreciated that "noise" is equivalent to "noise and interference" in meaning.

An apparatus and method for measuring a carrier-to-interference and noise ratio (CINR) using a pilot symbol according to the present invention will now be described more fully hereinafter with reference to the accompanying drawings.

FIG. 1 is a schematic diagram of a general OFDM transceiver. As shown therein, a general OFDM transceiver includes a serial-parallel converter; an inverse fast Fourier transform (IFFT) or fast Fourier transform (FFT) unit; and a frequency converter.

In the serial-parallel converter of a transmitter, a serial input data stream is converted into a parallel data stream as many as the number of sub-carriers, and an IFFT unit IFFT-transforms each parallel data stream through IFFT. Further, the IFFT-transformed data is converted into the serial data again, and transmitted via frequency conversion. Then, a receiver receives a transmitted signal through wire/wireless channels, and outputs data through a demodulation process in inverse relation to the transmitter.

Figure 2:
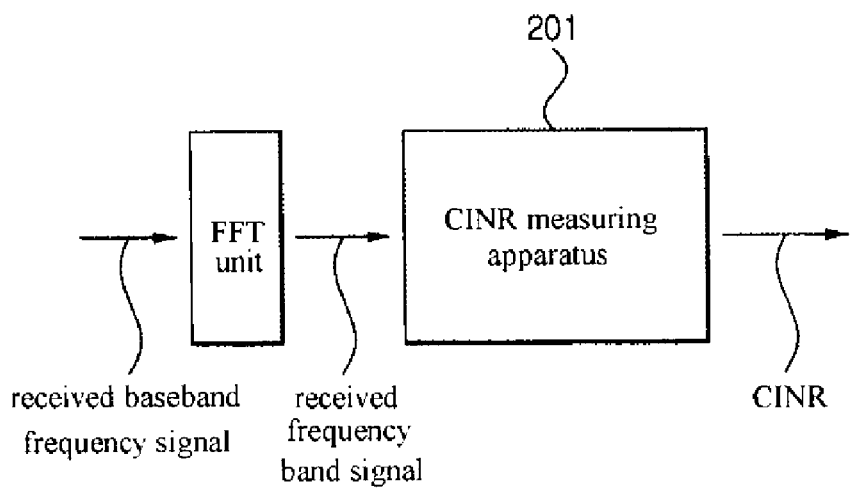
FIG. 2 illustrates an apparatus for measuring a carrier-to-interference and noise ratio (CINR), according to an exemplary embodiment of the present invention.

FIG. 2 illustrates an apparatus for measuring a carrier-to-interference and noise ratio (CINR), according to an exemplary embodiment of the present invention. As shown therein, a CINR measuring apparatus 201 receives a signal undergoing a pre-determined pre-processing operation that transitions a received baseband frequency signal into a frequency domain through FFT of the FFT unit.

The received signal transitioned to the frequency domain includes a preamble signal used for initial synchronization or cell searching, a pilot signal used for channel and synchronization estimation, a data signal containing substantial data, noise or the like. In this embodiment, the pilot signal will be used in estimating the CINR.

The CINR measuring apparatus 201 according to an exemplary embodiment of the present invention may be installed in a digital communication system such as a communication terminal or a base station wireless communication device. Here, the digital communication system may be supported by at least one of international electrical & electronics engineering (IEEE) 802.16d/e standard, wireless broadband Internet (WiBro), and world interoperability for microwave access (WiMAX).

Figure 3:
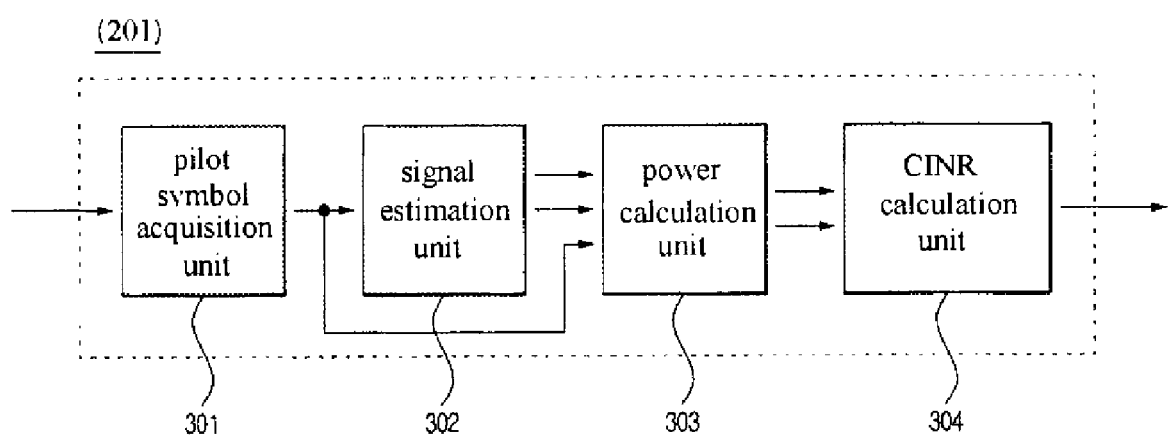
FIG. 3 is a block diagram showing an interior configuration of an apparatus for measuring a CINR, according to an exemplary embodiment of the present invention.

FIG. 3 is a block diagram showing configuration of an apparatus for measuring a CINR, according to an exemplary embodiment of the present invention. As shown therein, the CINR measuring apparatus 201 includes a pilot symbol acquisition unit 301, a signal estimation unit 302, a power calculation unit 303, and a CINR calculation unit 304.

The pilot symbol acquisition unit 301 acquires a pilot symbol (or a pilot symbol signal) from a baseband frequency signal. For example, the pilot symbol acquisition unit 301 makes an acquisition of a pilot symbol from a correlation value of a plurality of sub-carriers by correlating a preset pilot sequence with the plurality of sub-carriers of a baseband frequency signal as an OFDM/OFDMA signal. That is, since a transmission location of the pilot symbol is preset according to channel modes in an OFDM/OFDMA communication system, only the pilot symbol is easily extracted by correlating the pilot sequence having a preset uniform pattern with the sub-carriers of the received signal.

For instance, if a binary phase shift keying (BPSK) method is used for modulating the pilot signal having the preset uniform pattern, the BPSK method transmits signals corresponding to two phases of "0" and "π", so that the pilot sequence corresponds to a complex number of "1" and "−1". Thus, the pilot symbol can be obtained by correlating the pilot sequence with the received base band signal.

The signal estimation unit 302 estimates a pilot signal and a data signal from the pilot symbol obtained by the pilot symbol acquisition unit 301. Since the pilot symbol obtained by the pilot symbol acquisition unit 301 includes the pilot signal and noise and interference signals, the signal estimation unit 302 estimates only the pilot signal from the pilot symbol and estimates the noise and interference signals on the basis of the estimated pilot signal. More detailed operations of the signal estimation unit 302 will be described later with reference to FIG. 5.

According to an exemplary embodiment of the present invention, the pilot symbol acquisition unit 301 and the signal estimation unit 302 may employ different pilot symbol structures according to a plurality of channel modes.

FIG. 4 shows an example of a symbol structure corresponding to various channel modes of the IEEE 802.16d/e standard, according to an exemplary embodiment of the present invention. As shown therein, the pilot symbol has different structures according to four different channel modes such as downlink partial usage of sub-channels (DL PUSC), downlink full usage of sub-channels (DL FUSC), uplink partial usage of sub-channels (UL PUSC), and UL Band-adaptive modulation and coding (AMC).

Significant difference between the channel modes includes a fundamental unit of the symbol, a data symbol and a pilot symbol. Below, the structures of the data symbol and the pilot symbol according to the channel modes will be schematically described.

In the DL PUSC (refer to (401) of FIG. 4), a cluster is used as the fundamental unit. On the clusters, the pilot symbols are allocated in the 4$^{th}$ sub-carrier and the 8$^{th}$ sub-carrier in even symbols, and allocated in the 1$^{st}$ sub-carrier and the 13$^{th}$ sub-carrier in odd symbols.

In the DL FUSC (refer to (402) of FIG. 4), the location of the pilot symbol is determined by a variable set and a constant set. The constant set designates a fixed location for the pilot symbol, but the variable set designates the location of the pilot symbol on the basis of an equation. Here, the equation for determining the location (PilotLocation) of the pilot symbol is as follows.

PilotLocation=VariableSet#x+6*(FUSC_Symbol-Number %2)

In the above equation, each parameter is varied according to the size of FFT, and its specific value refers to IEEE 802.16d/e, WiBro and WIMAX. For reference, the location of the pilot symbol in (402) of FIG. 4 shows results from the equation of the variable set.

In the UL PUSC (refer to (403) of FIG. 4), a tile having a structure of four (sub-carriers)*three symbol is used as the fundamental unit. Here, the pilot symbols are located at four corners of the tile.

In the UL Band-AMC (refer to (404) of FIG. 4), a bin is used as the fundamental unit. In the bin including nine successive sub-carriers, one certain sub-carrier is allocated as the pilot symbol. Further, in the bin, the location of the pilot symbol varies depending on a symbol index. The Band-AMC has various types of the sub-channel structure, but (404) of FIG. 4 shows a structure of 2bins*3symbols by way of example.

Thus, the data symbol and the pilot symbol have different structures according to the channel modes, so that the pilot symbol acquisition unit 301 acquires the pilot symbol in proper consideration of the location and the size of the pilot symbol according to the channel modes.

The power calculation unit 303 calculates a power value of the data signal estimated by the signal estimation unit 302, and calculates the power value of the noise signal from a difference between the pilot symbol acquired by the pilot symbol acquisition unit 301 and the pilot signal estimated by the signal estimation unit 302. That is, the power value can be obtained by squaring the data signal and the noise signal, and the power calculation unit 303 accumulates the power value of the data signal and the power value of the noise signal for a predetermined period of time with regard to a plurality of pilot signal symbols, thereby further enhancing precision. Detailed operations of the power calculation unit 303 will be described later with reference to FIG. 6.

The CINR calculation unit 304 calculates a CINR on the basis of the power values of the data signal and the noise signal, which are calculated by the power calculation unit 303.

$$\frac{G \cdot \sum_{n=0}^{N-1} |\hat{h}(n)|^2}{\sum_{n=0}^{N-1} |P(n) - \hat{h}(n)|^2} \quad \text{(Formula 1)}$$

(Formula 1) expresses a calculation for obtaining a CINR through the power calculation unit 303 and the CINR calculation unit 304. Where, $\hat{h}(n)$ denotes an estimated pilot signal, p(n) denotes a pilot symbol including the pilot signal and the noise, N denotes an accumulative parameter corresponding to each terminal, and G denotes a parameter for matching a signal measured by using the pilot symbol with a gain of the data signal.

Further, n denotes a sub-carrier index of the pilot symbol, and N denotes the maximum pilot sub-carrier index allowable within a downlink frame, which can be determined with respect to power consumption. In the case of multiple-zones, N means the maximum value allowable in the corresponding zone.

For example, in the PUSC mode, if the FFT has a size of 1024, N may be 3120(=26*120).

(Formula 1) shows the calculation that estimates the data signal from the pilot signal and then estimates the noise and interference signals on the basis of the estimated data signal.

In recent times, a method of estimating the pilot signal has been widely used for channel estimation in wireless communication systems. Since the power level of the pilot signal is higher than those of other signals, the pilot signal is readily extracted even though a communication environment could be very poor due to high attenuation. Accordingly, the present invention proposes a new method of calculating the CINR of the data signal on the basis of the pilot signal. Thus, according to an exemplary embodiment of the present invention, an estimated value of the pilot signal, easily obtained in an existing system, is employed in calculating the CINR, thereby minimizing a separately added process and configuring an efficient hardware/software structure.

Referring to signal flow in the respective blocks shown in FIG. 3: the pilot symbol acquisition unit 301 receives the baseband frequency signal and outputs the pilot symbol; the signal estimation unit 302 receives the pilot symbol and estimates the data signal from the pilot signal; the power calculation unit 303 receives the pilot signal, the data signal and the pilot symbol and outputs the power values of the data signal and the noise signal; and the CINR calculation unit 304 receives the power values of the data signal and the noise signal and outputs the CINR.

Figure 5:
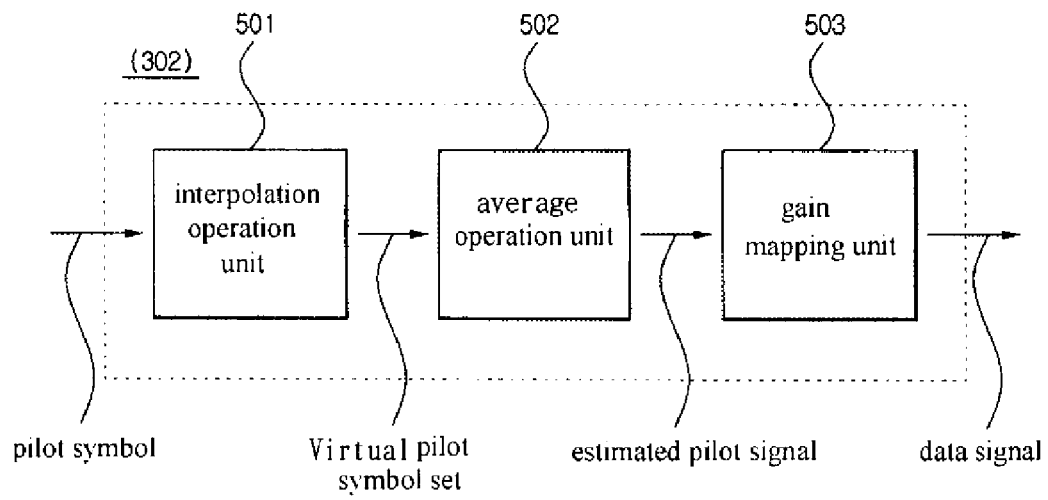
FIG. 5 is a block diagram showing configuration of a signal estimation unit according to an exemplary embodiment of the present invention.

FIG. 5 is a block diagram showing configuration of a signal estimation unit according to an exemplary embodiment of the present invention. As shown therein, the signal estimation unit 302 includes an interpolation operation unit 501, an average operation unit 502, and a gain mapping unit 503.

The interpolation operation unit 501 receives the pilot symbol, and performs an interpolation operation in a frequency domain, and creates a predetermined virtual pilot symbol set. According to an exemplary embodiment of the present invention, the pilot symbol acquired by the pilot symbol acquisition unit 301 is not enough to estimate the pilot signal because the amount of information is insufficient, or for other reasons, so that there is a need for more efficiently estimating the pilot signal on the basis of the acquired pilot symbol.

For example, the interpolation operation unit 501 increases the number of pilot symbols by copying the pilot symbols, and creates an intermediate value between the increased pilot symbols using a predetermined interpolation operation, thereby creating an virtual pilot symbol set that is used for estimating the pilot signal.

The interpolation operation unit 501 may employ linear interpolation, secondary interpolation, cubic spline interpolation, interpolation using a low-pass filter, etc. as an example of the interpolation. Here, the interpolation can be properly selected according to required conditions of a system or locations of the pilot symbol depending on different channels.

The average operation unit 502 averages the virtual pilot symbol set created in the interpolation operation unit 501 in a time domain, and estimates the pilot signal. The virtual pilot symbol set includes the noise and interference signals as well as the pilot signal. According to an exemplary embodiment of the present invention, the noise and interference signals are a kind of white noise, of which probability distribution is random with regard to occurrence and levels. Thus, the pilot symbols included in the respective virtual pilot symbol sets are averaged in a time domain, thereby suppressing the noise and interference signals.

Accordingly, the average operation unit 502 averages the virtual pilot symbol set in a time domain, thereby easily extracting the pilot signal with the noise and interference signals suppressed.

Thus, the signal estimation unit 302 can more precisely and easily extract the pilot signal using the interpolation operation unit 501 and the average operation unit 502. The signal estimation unit 302 finally extracts the data signal through the pilot signal. In general, the pilot signal is different in the transmission power from the data signal according to channel structures or OFDMA/OFDM symbol structures. Therefore, to estimate the data signal from the pilot signal, the signal estimation unit 302 multiplies the estimated pilot signal by a proper weighting, thereby adjusting its gain.

For example, if a level of the pilot signal is higher than a level of the data signal by a certain decibel, the gain is properly mapped so as to make the level of the pilot signal correspond to the level of the data signal, thereby estimating the data signal.

Figure 6:
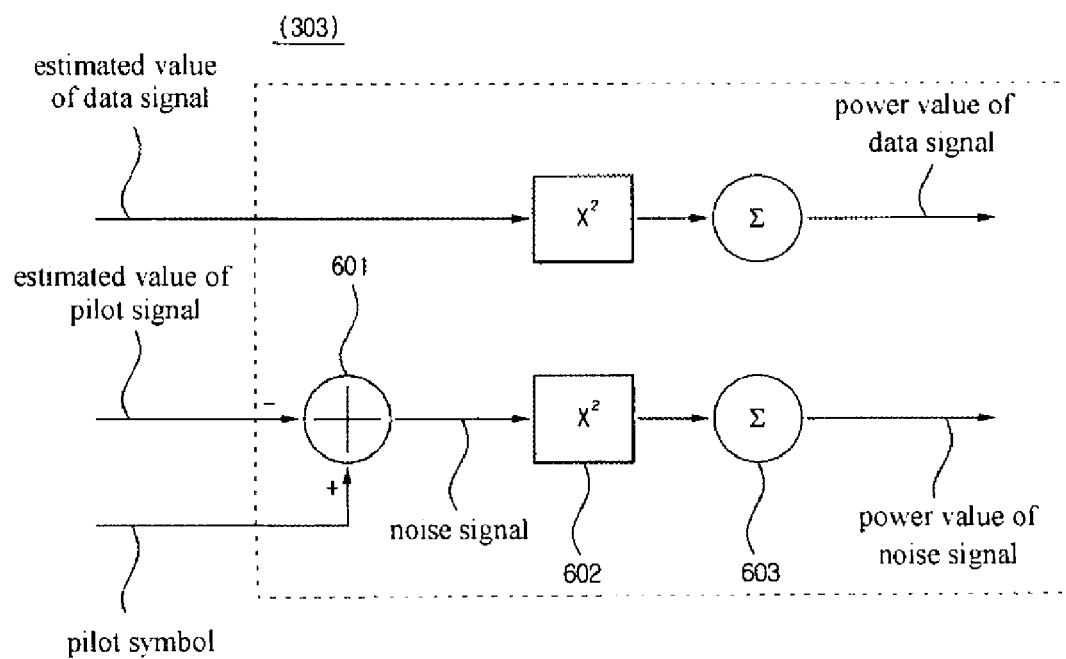
FIG. 6 is a block diagram showing configuration of a power calculation unit according to an exemplary embodiment of the present invention.

FIG. 6 is a block diagram showing an interior configuration of a power calculation unit according to an exemplary embodiment of the present invention. As shown therein, the power calculation unit 303 receives an estimated value of the data signal, an estimated value of the pilot signal and the pilot symbol, and outputs a power value of the data signal and a power value of a noise signal.

The power calculation unit 303 extracts the noise signal from difference between the pilot symbol and the estimated pilot signal. That is, the pilot symbol includes the pilot signal and the noise and interference signal, so that only the noise and interference signals can be extracted by subtracting the estimated pilot signal from the pilot symbol. The extracted data signal and the extracted noise signal are squared at operation 602 and cumulated for a certain period time 603.

Figure 7:
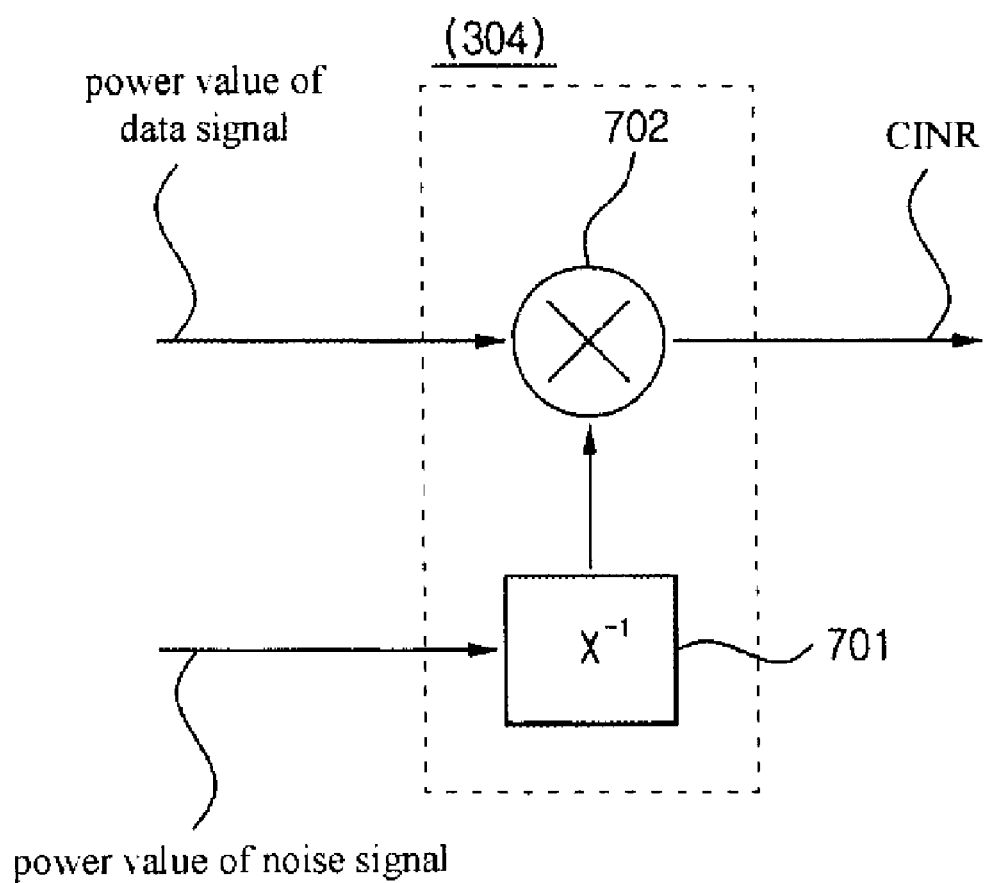
FIG. 7 is a block diagram showing configuration of a CINR calculation unit according to an exemplary embodiment of the present invention.

FIG. 7 is a block diagram showing an interior configuration of a CINR calculation unit according to an exemplary embodiment of the present invention.

The CINR expresses a ratio of carrier to noise in a signal transmission system. In the OFDM/OFDMA system according to an exemplary embodiment of the present invention, the CINR is measured as an example of the ratio of carrier to noise. Generally, the CINR, represented with a decibel (dB), is defined as a value obtained by dividing a data signal power sum of the sub-carrier by a noise and interference power sum.

To obtain the CINR, the CINR calculation unit 304 inverses the power value of the noise signal 701, and inputs the inversed value along with the power value of the data signal to a multiplier 702 (refer to FIG. 7). For reference, the configurations and the calculating procedures of the power calculation unit 303 and the CINR calculation unit 304 can be expressed in (Formula 1) mentioned referring to FIG. 3.

The CINR measuring apparatus according to an exemplary embodiment of the present invention further includes a transmission power generating unit for determining transmission power on the basis of the measured CINR. The transmission power generating unit will be described later in more detail, with reference to FIGS. 8 and 9.

Figure 8:
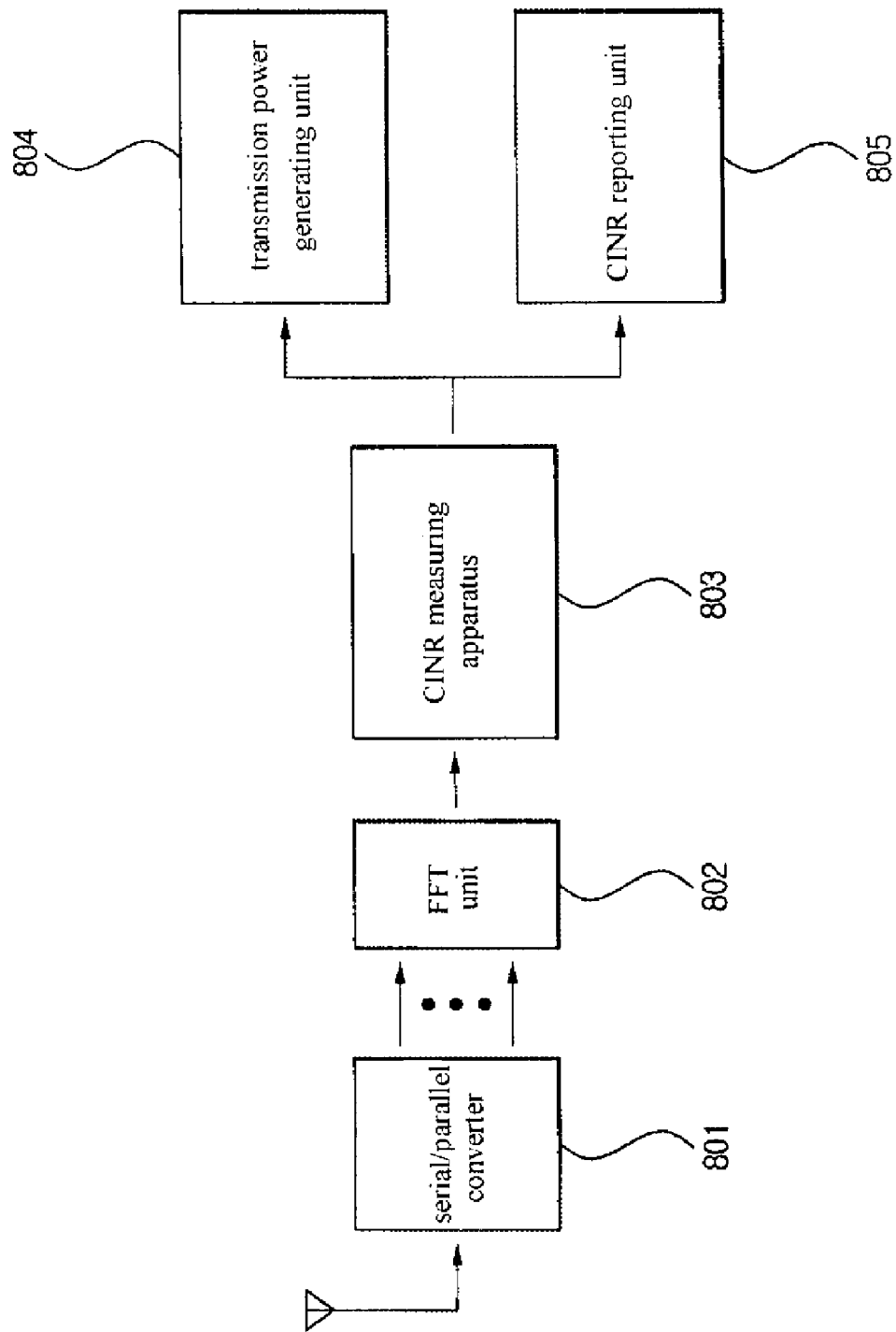
FIG. 8 is a block diagram showing configuration of a communication terminal including an apparatus for measuring a CINR, according to an exemplary embodiment of the present invention.

FIG. 8 is a block diagram showing configuration of a communication terminal including an apparatus for measuring a CINR, according to an exemplary embodiment of the present invention. In this embodiment illustrated in FIG. 8, the measured CINR is directly or indirectly reported to a base station through an uplink.

The communication terminal according to an exemplary embodiment of the present invention includes a CINR measuring apparatus 803 that has a pilot symbol acquisition unit for acquiring the pilot symbol from the baseband frequency signal; a signal estimation unit for estimating the pilot signal and the data signal from the pilot symbol, respectively; a power calculation unit for calculating the power value of the estimated data signal and calculate the power value of the noise signal from the difference between the pilot symbol and the estimated pilot signal; and a CINR calculation unit for calculating the CINR on the basis of the power values of the data signal and the noise signal. Further, the communication terminal includes a transmission power generating unit 804 for determining the transmission power, and a CINR reporting unit 805 for reporting the CINR to the base station, in which the transmission power generating unit 804 and the CINR reporting unit 805 are connected in parallel to the CINR measuring apparatus 803.

The transmission power generating unit 804 performs reverse power control through the measured CINR. Here, the reverse power control means that the base station controls the transmission power of the terminal. According to an exemplary embodiment of the present invention, the transmission power generating unit 804 flexibly controls the current transmission power to an optimum state on the basis of the measured CINR, so that the intensity of the signal received in the communication terminal can be maintained constantly even if variations in intensity are not expected.

The CINR reporting unit 805 converts the CINR to a format required in the base station, for example, to have a dB scale, a mean value and variance, and then reports the converted CINR to the base station, thereby allowing the base station to utilize the CINR.

Figure 9:
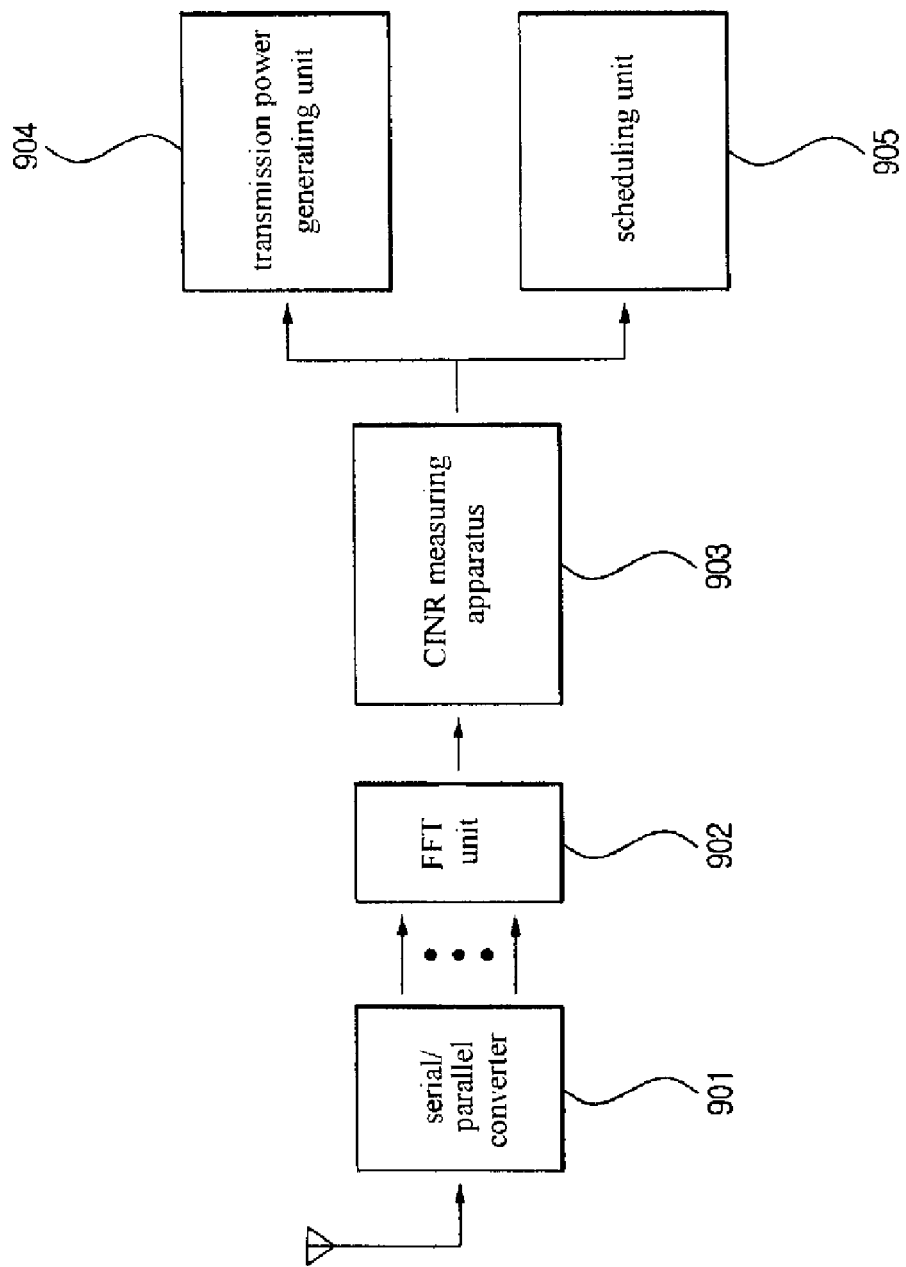
FIG. 9 is a block diagram showing configuration of a base station wireless communication device including an apparatus for measuring a CINR, according to an exemplary embodiment of the present invention.

FIG. 9 is a block diagram showing a configuration of a base station wireless communication device including an apparatus for measuring a CINR, according to an exemplary embodiment of the present invention. In this embodiment, the measured CINR is transferred to the terminal through a downlink.

The base station wireless communication device according to an exemplary embodiment of the present invention includes a CINR measuring apparatus 903 that has: a pilot symbol acquisition unit for acquiring the pilot symbol from the baseband frequency signal; a signal estimation unit for estimating the pilot signal and the data signal from the pilot symbol, respectively; a power calculation unit for calculating the power value of the estimated data signal; a power calculation unit for calculating the power value of the noise signal from difference between the pilot symbol and the estimated pilot signal; and a CINR calculation unit for calculating the CINR on the basis of the power values of the data signal and the noise signal. Further, the base station wireless communication device includes a transmission power generating unit 904 to control the transmission power, and a scheduling unit 905 to adjust wireless resource components on the basis of the CINR, in which the transmission power generating unit 904 and the scheduling unit 905 are connected in parallel to the CINR measuring apparatus 903.

The transmission power generating unit 904 gives instructions to control the transmission power, thereby maintaining the constant intensity of the signal received from all communication terminals.

The scheduling unit 905 allocates and schedules the wireless resource components to make the communication terminal provide the maximum throughput. The wireless resource components include a modulating mode, a coding mode, a code type, a coding rate, etc. According to an exemplary embodiment of the present invention, the scheduling unit 905 adaptively changes the wireless resource components in consideration of the CINR.

Figure 10:
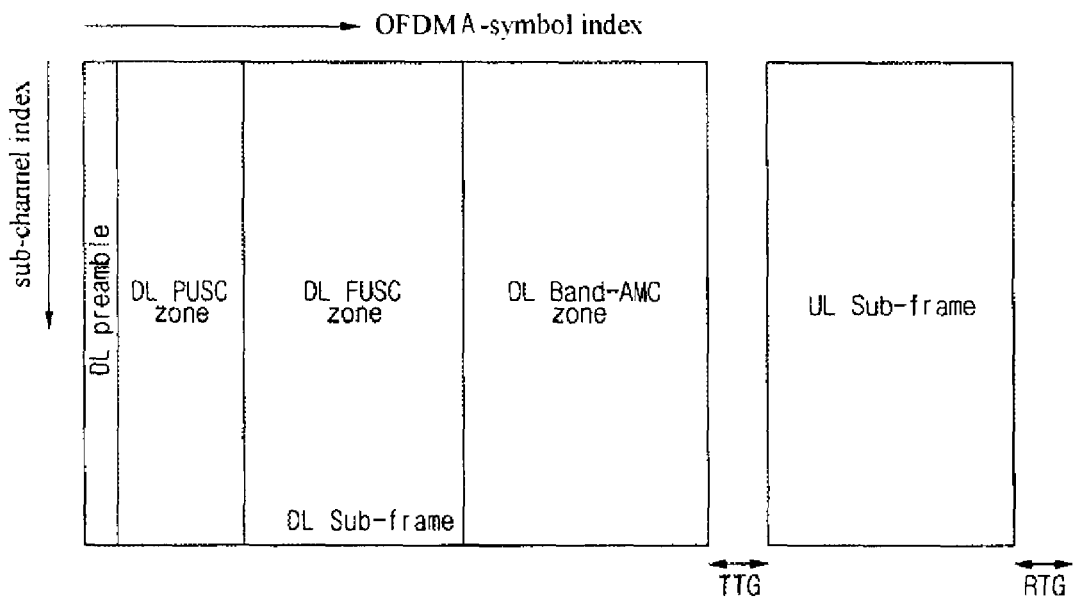
FIG. 10 shows an example of a sub-frame structure of multiple-zones according to an exemplary embodiment of the present invention.

In the IEEE 802.16d/e standard, both the downlink (DL) and the uplink (UL) support the multiple-zone. FIG. 10 shows an example of a sub-frame structure in a multiple-zone according to an exemplary embodiment of the present invention. In the multiple-zone, one DL sub-frame is divided into predetermined sections, and different channel modes are used according to the sections. Further, the DL PUSC, the DL FUSC, and the DL Band-AMC may be used for each channel mode of the downlink (DL).

Figure 11:
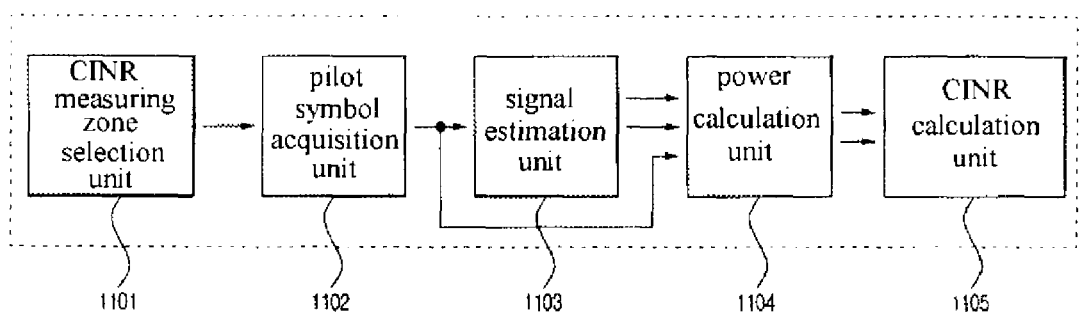
FIG. 11 is a block diagram showing configuration of an apparatus for measuring a CINR, which can support a multiple-zone mode, according to an exemplary embodiment of the present invention.

FIG. 11 is a block diagram showing an interior configuration of an apparatus for measuring a CINR, which can support a multiple-zone mode, according to an exemplary embodiment of the present invention.

In a digital communication system supporting the multiple-zone mode according to an exemplary embodiment of the present invention, a CINR measuring apparatus includes: a CINR measuring zone selection unit 1101 for selecting a pre-determined zone for measuring the CINR from the multiple-zone; a pilot symbol acquisition unit 1102 for acquiring the pilot symbol from the baseband frequency signal; a signal estimation unit 1103 for estimating the pilot signal and the data signal from the pilot symbol, respectively; a power calculation unit 1104 for calculating the power value of the estimated data signal and calculating the power value of the noise signal from difference between the pilot symbol and the estimated pilot signal; and a CINR calculation unit 1105 for calculating the CINR on the basis of the power values of the data signal and the noise signal.

As an example, if the CINR is measured in the downlink (DL), the base station may instruct the terminal to measure the CINR in a certain zone and report it to the base station. Specifically, if the base station instructs the terminal to measure the CINR of the DL PUSC zone and report it to the base station, the terminal uses the pilot symbols only from the DL PUSC zone to measure the CINR, excluding other zones.

In the meantime, if the terminal measures a reference CINR in the DL and reports it to the base station, the reference CINR is measured through the pilot symbols from all zones even if they are multiple-zones like FIG. 10. In other words, the terminal measures the reference CINR through the pilot symbols of all zones regardless of the multiple-zones. Further, the terminal measures the reference CINR through the pilot symbols that belong to the zone based on the instruction of the base station.

The CINR measuring apparatus shown in FIG. 11 includes the CINR measuring zone selection unit 1101 for selecting a predetermined zone for measuring the CINR from the multiple-zones. For example, in the case that the CINR measuring apparatus is provided in the terminal, if the CINR is measured in a certain zone of the DL, the CINR measuring zone selection unit 1101 receives the zone selection signal and selects the zone to be measured in the CINR from the base station, and the pilot symbol acquisition unit 1102 acquires the pilot symbol with regard to the zone selected by the CINR measuring zone selection unit 1101. As described above with respect to FIG. 4, the zones are different in the structure of the pilot symbol, so that the pilot symbol acquisition unit 1102 can properly acquire the pilot symbol according to the channel modes allocated to the zone.

If the reference CINR is measured in the DL, the CINR measuring zone selection unit 1101 receives the zone selection signal about all multiple-zones from the base station, and the pilot symbol acquisition unit 1102 acquires the pilot symbol with regard to all zones.

In the multiple-zone mode, different channel modes can be used according to users (terminals), so that the base station selects the channel mode (zone) for each terminal and instructs the terminal to measure the CINR of the corresponding zone. According to an exemplary embodiment of the present invention, the scheduling unit of the base station acquires information about the CINR corresponding to each zone while allocating the wireless resource component, and properly estimates wireless channel states on the basis of the information, thereby properly allocating the zone to each terminal. Also, the terminal compares the CINR and the reference CINR with respect to the currently allocated zone, thereby positively requiring channel allocation to another zone. Alternatively, the CINR measuring apparatus illustrated in FIG. 11 may be applied to the uplink (UL).

As an example of setting and updating the multiple-zone mode, the DL multiple-zone mode is basically set up and updated by using a message of "DL Zone switch IE", and the UL multiple-zone mode is basically set up and updated by using a message of "UL Zone IE".

As described above, various exemplary embodiments of the CINR measuring apparatus according to the present invention are illustrated with reference to FIGS. 8, 9 and 11. The signal estimation unit, the power calculation unit and the CINR calculation unit described in the exemplary embodiments referring to FIGS. 2 through 7 may be used as those of the exemplary embodiments referring to FIGS. 8, 9 and 11, and thus repetitive descriptions thereof will be avoided.

Below, simulation results using a CINR measuring method according to an exemplary embodiment of the present invention will be described with reference to FIGS. 12 through 15.

In these simulations, the CINR is measured with respect to four different channel modes such as DL PUSC, DL FUSC, UL PUSC, and UL Band-AMC. Further, experiments are carried out under the condition that a terminal moves at a speed of 3 km/h along with a pedestrian-A in a channel model of additive white Gaussian noise (AWGN) and international telecommunication union radio communication sector (ITU-R). Further, FFT applied to the simulation has a size of 1024, and the CINR is measured about three thousand times and then averaged.

In the graph, "Target CINR" denotes a target for a CINR, "Est. CINR" denotes results from a CINR measuring algorithm using a pilot symbol, and "Est. Error" denotes a difference between "Target CINR" and "Est. CINR," i.e., a measuring error in the CINR measuring algorithm.

In the graph, a horizontal axis denotes Eb/No [dB] (a ratio of signal power to noise power per 1 Bit data), and a vertical axis denotes real measured value and error values. Thus, it is preferable that the horizontal axis and the vertical axis have the same value and an error has a value of "0" or a constant value, which results in a linear graph.

FIG. 12 is a graph showing a simulation result of a CINR measured using a pilot symbol on a DL PUSC channel, according to an exemplary embodiment of the present invention, in which (1201) is measured under an AWGN communication environment, and (1202) is measured under the condition that the terminal moves at a speed of 3 km/h along with a pedestrian-A. Both (1201) and (1202) show that results are largely different from "Target CINR" and "Est. CINR" but approximate to a value of "0" or have a constant value as "Est. Error". Thus, the simulation result is valid in measuring the CINR.

FIG. 13 is a graph showing a simulation result of a CINR measured using a pilot symbol on a DL FUSC channel, according to an exemplary embodiment of the present invention, in which (1301) is measured under an AWGN communication environment, and (1302) is measured under the condition that the terminal moves at a speed of 3 km/h along with a pedestrian-A. Both (1301) and (1302) show valid simulation results like FIG. 12.

FIG. 14 is a graph showing a simulation result of a CINR measured using a pilot symbol on a UL PUSC channel, according to an exemplary embodiment of the present invention, in which (1401) is measured under an AWGN communication environment, and (1402) is measured under the condition that the terminal moves at a speed of 3 km/h along with a pedestrian-A. Both (1401) and (1402) show valid simulation results like FIGS. 12 and 13.

FIG. 15 is a graph showing a simulation result of a CINR measured using a pilot symbol on a UL Band-AMC channel, according to an exemplary embodiment of the present invention, in which (1501) is measured under an AWGN communication environment, and (1502) is measured under the condition that the terminal moves at a speed of 3 km/h along with a pedestrian-A. As shown therein, both (1201) and (1202) show that "Est. Error" approximates to "0" as a linear shape with a constant value.

Figure 16:
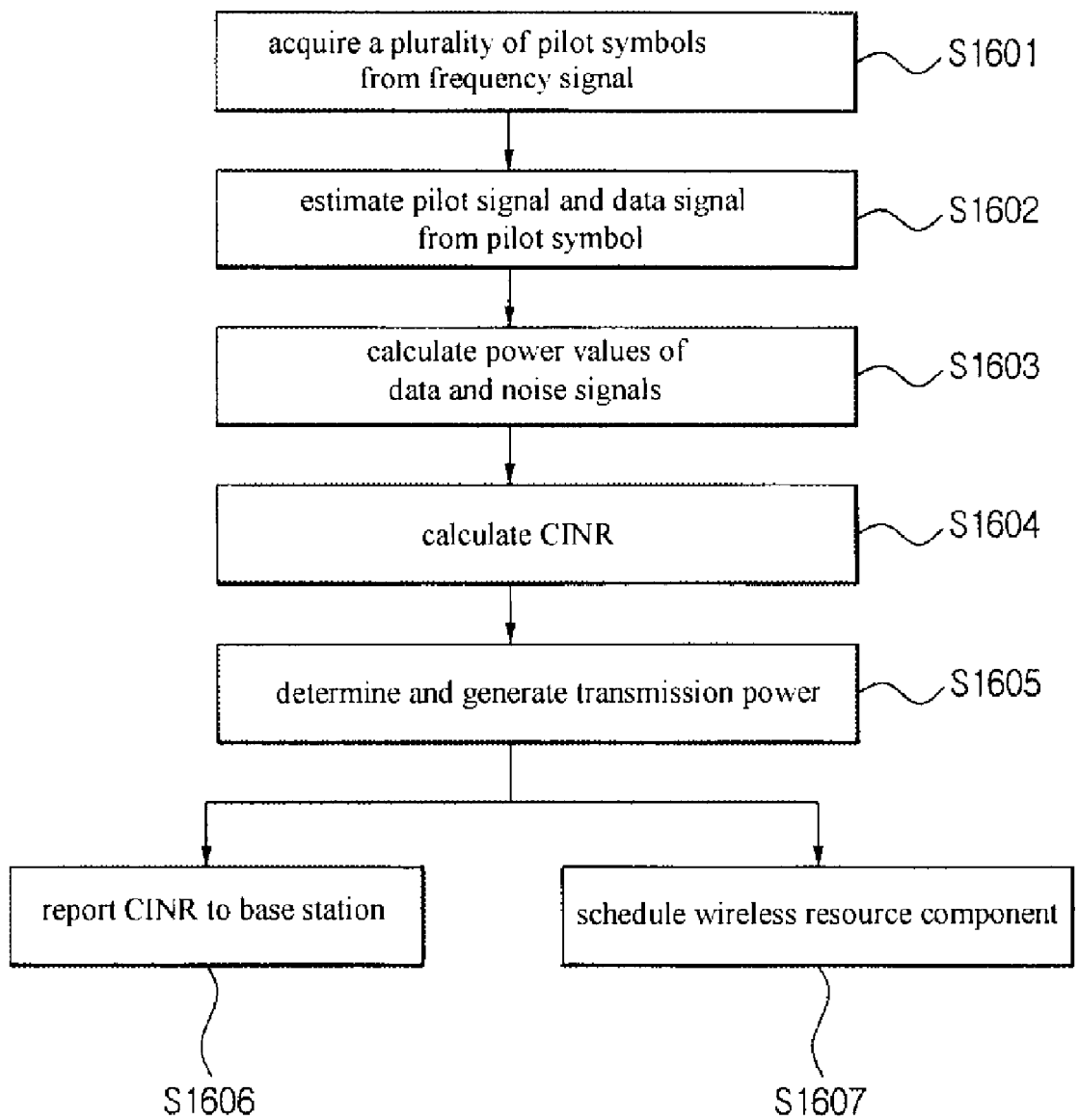
FIG. 16 is a flowchart of measuring a CINR using a pilot symbol according to an exemplary embodiment of the present invention.

FIG. 16 is a flowchart of measuring a CINR using a pilot symbol according to an exemplary embodiment of the present invention.

In step S1601, the pilot symbol is acquired from the baseband frequency signal. Specifically, in this operation, the pilot symbol is acquired from the correlation value of the plurality of sub-carriers by correlating the preset pilot sequence with the plurality of sub-carriers of the received signal. Since the transmission location of the pilot symbol is preset according to channel modes in the OFDM/OFDMA communication system, only the pilot symbol is easily extracted by correlating the pilot sequence having a preset uniform pattern with the sub-carriers of the received signal.

In step S1602, the pilot signal and the data signal are estimated from the pilot symbol acquired in step S1601. Since the pilot symbol includes the pilot signal and the noise and interference signals, only the pilot signal is estimated from the pilot symbol, and the noise and interference signals are estimated on the basis of the estimated pilot signal.

According to an exemplary embodiment of the present invention, step S1602 of estimating the pilot signal from the pilot symbol includes an operation of performing interpolation to the pilot symbol in a frequency domain and creating the virtual pilot symbol set, and an operation of averaging the virtual pilot symbol set in a time domain and estimating the pilot signal.

That is, since the pilot symbol acquired in step S1601 is not enough to estimate the pilot signal, the number of pilot symbols is increased by copying the pilot symbols and the intermediate value is created between the increased pilot symbols through a pre-determined interpolation operation, thereby creating the virtual pilot symbol set that is adaptive for estimating the pilot signal.

The virtual pilot symbol set includes the noise and interference signals as well as the pilot signal. The noise and interference signals are a kind of white noise, and thus the pilot symbols included in the respective virtual pilot symbol sets are averaged, thereby suppressing the noise and interference signals.

Accordingly, in this operation, the virtual pilot symbol sets are averaged in a time domain, thereby easily extracting only the pilot signal with the noise and interference signals suppressed.

Meanwhile, the operation of estimating the data signal from the pilot symbol includes the operation of estimating the data signal by adjusting the gain of the estimated pilot signal. In general, the pilot signal is different in the transmission power from the data signal according to channel structures or OFDMA/OFDM symbol structures. Therefore, to estimate the data signal from the pilot signal, the gain of the estimated pilot signal is adjusted to be adaptive to the data signal, thereby finally estimating the data signal.

In step S1603, the power values of the data signal and the noise signal are output from the data signal, the estimated pilot signal and the pilot symbol.

Specifically, the noise signal is extracted from difference between the pilot symbol and the estimated pilot signal. That is, the pilot symbol includes the pilot signal and the noise and interference signal, so that only the noise and interference signals can be extracted by subtracting the estimated pilot signal from the pilot symbol. The noise and interference signals and the data signal are squared and accumulated for a certain period of time.

In step S1604, the CINR is calculated using the power values of the noise signal and the data signal. In the OFDM/OFDMA system according to an exemplary embodiment of the present invention, the CINR is measured as an example of the ratio of carrier to noise.

Generally, the CINR, represented with a decibel (dB), is defined as a value obtained by dividing the data signal power sum of the sub-carrier by the noise and interference power sum. To obtain the CINR in step S1604, the power value of the noise signal is inversed, and the inversed value along with the power value of the data signal is input to the multiplier.

Further, the method of measuring the CINR using the pilot symbol may include steps S1605 through S1607.

In step S1605, the transmission power can be determined or created on the basis of the CINR measured in steps S1601 through S1604.

In the case where the foregoing method is applied to the terminal, the terminal itself may reversely control the transmission power in order to increase the intensity of the signal transmitted from the terminal to the base station. In the case where the foregoing method is applied to the base station, instructions are given so that the transmission power of the base station is properly controlled to maintain the intensity of the signal received in the terminal. Therefore, the intensity of the signal received in the communication terminal or the base station is maintained at a constant in an unexpected situation.

In step S1606, the CINR is converted to have a transmission format corresponding to a certain base station and is reported to that base station, so that the base station can utilize the CINR.

In step S1607, the modulating mode, the coding mode, the code type, the coding rate, etc. are efficiently allocated and scheduled so as to make the communication terminal provide the maximum throughput.

As mentioned above, the method of measuring the CINR through the pilot symbol is described according to an exemplary embodiment of the present invention, and the descriptions according to embodiments of FIGS. 1 through 11 may be also applied to these embodiments, so that repetitive descriptions thereof will be avoided.

The method of measuring the CINR on the basis of the pilot symbol according to the present invention may be implemented as program commands executed by various computers and recorded in a computer readable medium. The computer readable medium includes a program command, a data file, a data structure or a combination thereof. The program command stored in the computer readable medium may be particularly designed for the present invention or publicly known to those skilled in the art relating to computer software. For example, a computer readable recording medium includes a hard disk; a floppy disk; magnetic media such as a magnetic tape; optical media such as CD-ROM, DVD or the like; magneto-optical media such as a floppy disk, a ROM, a RAM, a flash memory, etc., which can store and execute the program command. The medium may include a transmit medium for a light or metal line, a wave guide, etc., which contains carriers to transmit a signal of designating the program command, the data structure, etc. The program command includes not only a machine language code made by a compiler, but also a high-level language code which can be executed by a computer through an interpreter. The foregoing hardware components can be configured to perform the operation according to the present invention by one or more software modules, and vice versa.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

The invention claimed is:

1. An apparatus for measuring a carrier-to-interference and noise ratio (CINR) from a pilot symbol in a digital communication system, the apparatus comprising:
a pilot symbol acquisition unit implemented by a processor for acquiring the pilot symbol from a baseband frequency signal;
a signal estimation unit for estimating a pilot signal and a data signal from the pilot symbol;
a power calculation unit for calculating a power value of the estimated data signal and calculating a power value of a noise signal from a difference between the pilot symbol and the estimated pilot signal; and
a CINR calculation unit for calculating the CINR on the basis of the power values of the data and noise signals,
wherein the pilot symbol acquisition unit acquires the pilot symbol according to a channel mode included in a terminal, the channel mode selected from among Band adaptive modulation and coding (AMC), partial usage of sub-channels (PUSC), optional partial usage of sub-channels (OPUSC), and full usage of sub-channels (FUSC),
wherein the signal estimation unit comprises a gain mapping unit for estimating the data signal by multiplying the estimated pilot signal by a weighting.

2. The apparatus according to claim 1, wherein the digital communication system is supported by at least one of international electrical & electronics engineering (IEEE) 802.16d/e standard, wireless broadband internet (WiBro), and world interoperability for microwave access (WiMAX).

3. The apparatus according to claim 1, wherein the baseband frequency signal comprises an orthogonal frequency division multiplexing (OFDM) signal or an orthogonal frequency division multiplexing access (OFDMA) signal.

4. The apparatus according to claim 1, wherein the signal estimation unit comprises:
an interpolation operation unit for creating a virtual pilot symbol set by interpolating the pilot symbol in a frequency domain; and
an average operation unit for estimating the pilot signal by averaging the virtual pilot symbol set in a time domain.

5. The apparatus according to claim 1, wherein the power calculation unit accumulates and calculates the power values of the data and noise signals with regard to a plurality of pilot signal symbols, respectively.

6. The apparatus according to claim 1, further comprising a transmission power generating unit for determining transmission power on the basis of the CINR.

7. A communication terminal comprising:
a pilot symbol acquisition unit implemented by a processor for acquiring a pilot symbol from a baseband frequency signal;
a signal estimation unit for estimating a pilot signal and a data signal from the pilot symbol;
a power calculation unit for calculating a power value of the estimated data signal and calculating a power value of a noise signal from a difference between the pilot symbol and the estimated pilot signal;
a carrier-to-interference and noise ratio (CINR) calculation unit for calculating a CINR on the basis of the power values of the data and noise signals; and
a CINR reporting unit for reporting the CINR to a base station,
wherein the pilot symbol acquisition unit acquires the pilot symbol according to a channel mode included in the terminal, the channel mode selected from among Band adaptive modulation and coding (AMC), partial usage of sub-channels (PUSC), optional partial usage of sub-channels (OPUSC), and full usage of sub-channels (FUSC),
wherein the signal estimation unit comprises a gain mapping unit for estimating the data signal by multiplying the estimated pilot signal by a weighting.

8. A base station wireless communication apparatus comprising:
a pilot symbol acquisition unit implemented by a processor for acquiring a pilot symbol from a baseband frequency signal;
a signal estimation unit for estimating a pilot signal and a data signal from the pilot symbol;
a power calculation unit for calculating a power value of the estimated data signal and calculating a power value of a noise signal from a difference between the pilot symbol and the estimated pilot signal;
a carrier-to-interference and noise ratio (CINR) calculation unit for calculating a CINR on the basis of the power values of the data and noise signals, respectively; and
a scheduling unit for controlling wireless resource components using the CINR,
wherein the pilot symbol acquisition unit acquires the pilot symbol according to a channel mode included in a terminal, the channel mode selected from among Band adaptive modulation and coding (AMC), partial usage of sub-channels (PUSC), optional partial usage of sub-channels (OPUSC), and full usage of sub-channels (FUSC),
wherein the signal estimation unit comprises a gain mapping unit for estimating the data signal by multiplying the estimated pilot signal by a weighting.

9. The base station wireless communication apparatus according to claim 8, wherein the wireless resource component comprises at least one of a modulating mode, a coding mode, a code type, and a coding rate.

10. An apparatus for measuring a carrier-to-interference and noise ratio (CINR) in a digital communication system supporting multiple-zone modes, the apparatus comprising:

a CINR measuring zone selection unit for selecting a zone mode for measuring the CINR from the multiple-zones;

a pilot symbol acquisition unit implemented by a processor for acquiring a pilot symbol for the selected zone from the multiple-zones;

a signal estimation unit for estimating a pilot signal and a data signal from the pilot symbol;

a power calculation unit for calculating a power value of the estimated data signal and calculating a power value of a noise signal from a difference between the pilot symbol and the estimated pilot signal; and a carrier-to-interference and noise ratio (CINR) calculation unit for calculating the CINR on the basis of the power values of the data and noise signals, respectively, wherein the CINR measuring zone selection unit selects the zone mode included in a terminal from among Band adaptive modulation and coding (AMC), partial usage of sub-channels (PUSC), optional partial usage of sub-channels (OPUSC), and full usage of sub-channels (FUSC), wherein the pilot symbol acquisition unit acquires the pilot symbol according to the zone mode selected by the CINR measuring zone selection unit, wherein the signal estimation unit comprises a gain mapping unit for estimating the data signal by multiplying the estimated pilot signal by a weighting.

11. The apparatus according to claim 10, wherein the CINR comprises a reference CINR, and the CINR measuring zone selection unit selects all multiple-zones.

12. A method of measuring a carrier-to-interference and noise ratio (CINR) from a pilot symbol in a digital communication system, the method comprising the steps of:

acquiring the pilot symbol from a baseband frequency signal;

estimating a pilot signal and a data signal from the pilot symbol;

calculating a power value of the estimated data signal and calculating a power value of a noise signal from a difference between the pilot symbol and the estimated pilot signal; and calculating the CINR on the basis of the power values of the data and noise signals, wherein the pilot symbol is acquired according to a channel mode included in a terminal, the channel mode selected from among Band adaptive modulation and coding (AMC), partial usage of sub-channels (PUSC), optional partial usage of sub-channels (OPUSC), and full usage of sub-channels (FUSC), wherein the data signal is estimated by multiplying the estimated pilot signal by a weighting.

13. The method according to claim 12, wherein the step of estimating the pilot signal from the pilot symbol comprises the steps of:

creating a virtual pilot symbol set by interpolating the pilot symbol in a frequency domain; and estimating the pilot signal by averaging the virtual pilot symbol set in a time domain.

* * * * *